United States Patent Office 3,324,561
Patented June 13, 1967

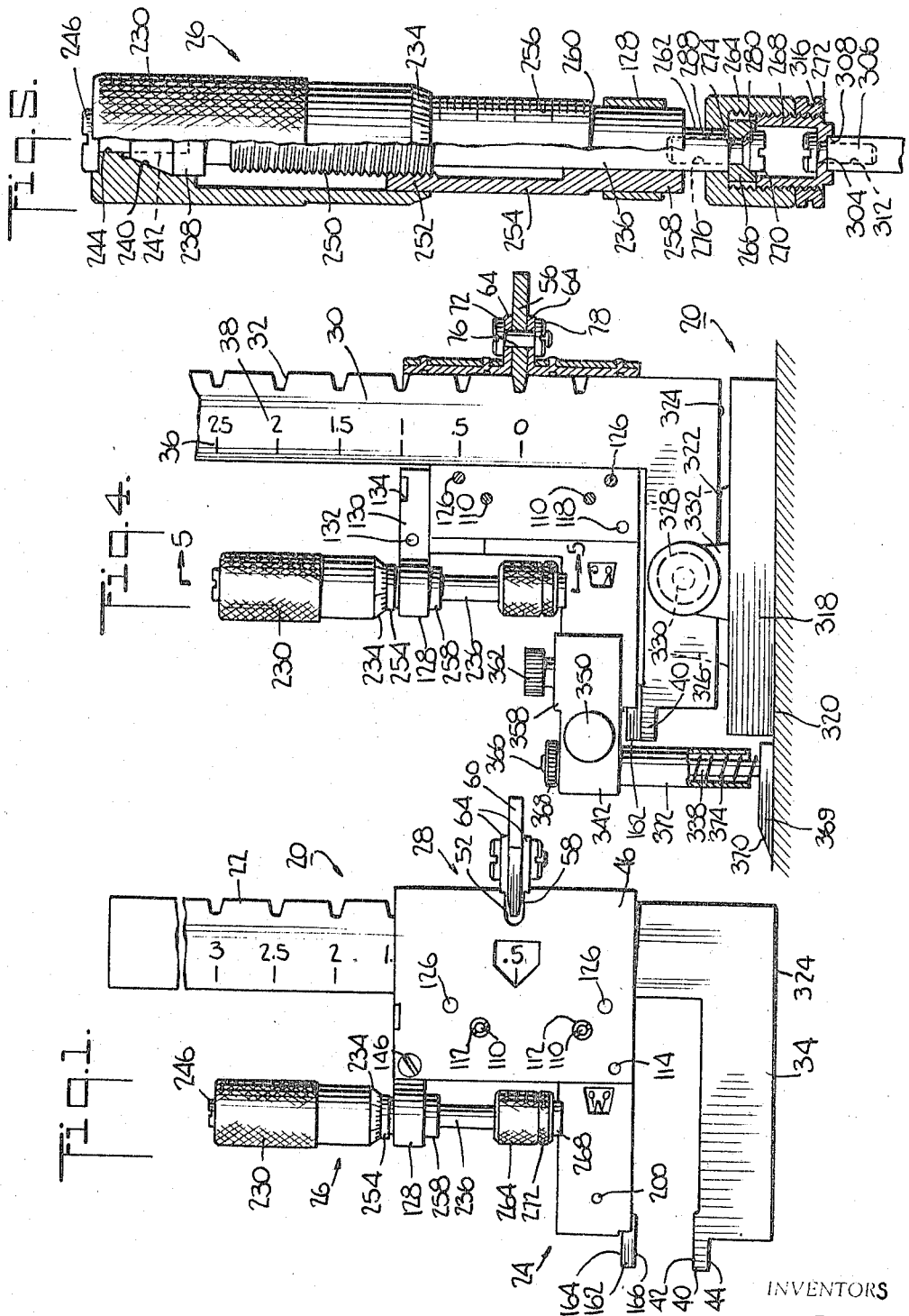

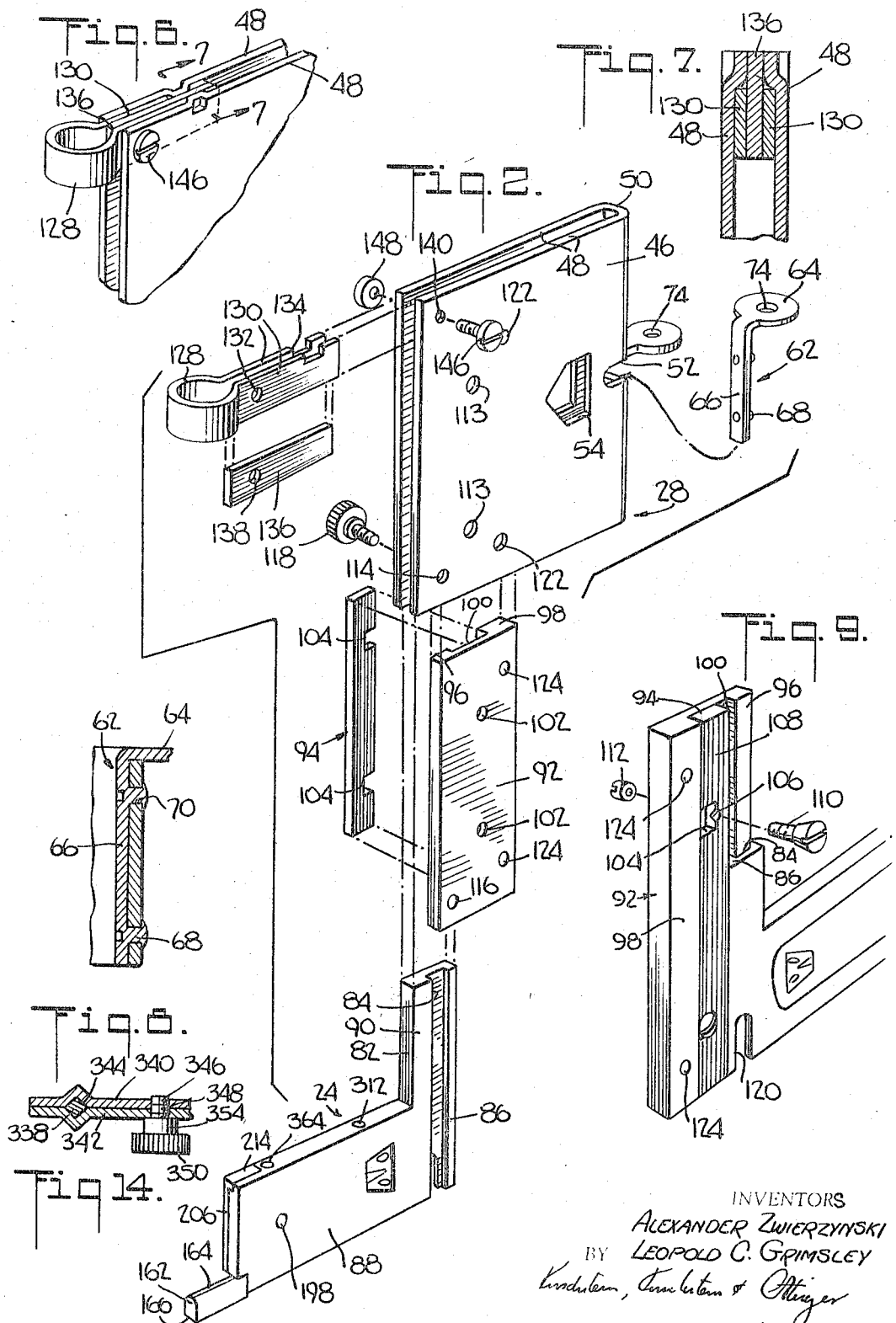

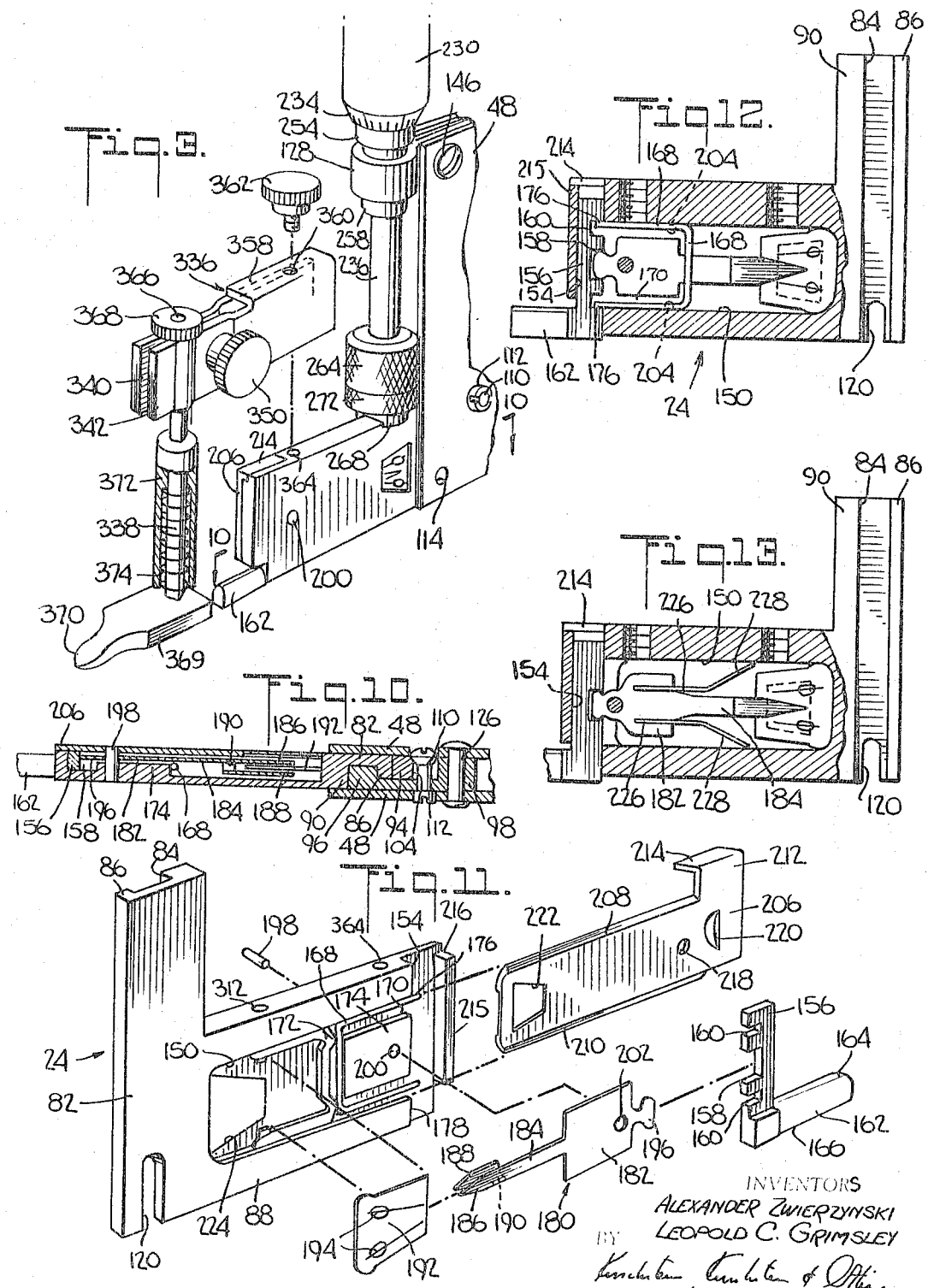

3,324,561
MICROMETER CALIPER
Alexander Zwierzynski, Bronx, and Leopold C. Grimsley, Jackson Heights, N.Y., assignors to H & A Instrument Corp., New York, N.Y., a corporation of New York
Filed Apr. 29, 1964, Ser. No. 363,468
9 Claims. (Cl. 33—147)

This invention relates to precision measuring instruments and, more particularly, to a new and improved micrometer caliper.

A micrometer caliper is a measuring instrument designed to give very accurate readings of the dimensions of objects, i.e., readings accurate to at least $\frac{1}{1000}$ of an inch. Conventional micrometer calipers include a fixed jaw and a movable jaw, the movable jaw being secured on the micrometer spindle and being mounted for axial (but not rotary) movement towards or away from the fixed jaw. The spindle is threaded and rotates in a tapped hub; it is actuated by rotation of the thimble of the micrometer. The object to be measured is placed between the movable jaw and the fixed jaw or said jaws are inserted into the object if an internal dimension is to be ascertained.

A serious problem with conventional micrometer caliper is that of knowing when the instrument should be read, i.e., when the jaws are so positioned that the caliper accurately reads the dimension being measured. In one type of conventional micrometer caliper the reading is taken when an estimated amount of manually applied torque on the thimble no longer produces rotary movement thereof. This does not provide accurate reproducible readings because the estimated torque varies from time to time depending upon the effort exerted by the user and also because the internal frictional drag of the micrometer varies with changes in temperature, humidity and internal lubrication. Another type of micrometer caliper employs a constant torque clutch to transmit torque from the fingers of the user to the thimble. This, too, is unsatisfactory because the torque at the spindle is subject to variations caused by changes in temperature, humidity and changes in internal lubrication; moreover, the constant torque clutch has the further disadvantage that the spring pressure may change from time to time because the spring pressure varies with the operation of a ratchet, so that highly accurate readings cannot be reproducibly obtained.

A micrometer spindle rotates and shifts axially when the thimble is rotated with respect to the threaded hub of the spindle; however, since the movable jaw secured to the spindle can only move axially, a means must be included to nullify the rotary motion component of the spindle. A problem with existing micrometer calipers is that the mechanism for canceling the rotary motion component of the micrometer spindle has been quite complex and, therefore, expensive to make and difficult to repair.

Other disadvantages of conventional micrometer calipers are that they have been designed only for righthanded users and are therefore extremely difficult for lefthanded users to read. Also, where height gauges or scribing attachments have been provided for detachable coupling to the movable jaw, it has been difficult to zero the attachment to the caliper and this detracts from accuracy in the use of the attachments.

It is a principal object of the present invention to provide a micrometer caliper of the character described which is capable of taking reproducible accurate readings without variation.

Another object of the present invention is to provide a rugged, compact, durable, foolproof, easy to make micrometer caliper.

A further object of the present invention is to provide a micrometer caliper of the character described in which the mechanism that cancels the rotary motion component of the micrometer spindle is extremely simple to make, easy to adjust and readily repaired.

It is an additional object of the present invention to provide a micrometer caliper of the character described which can be easily and accurately used by both righthanded and lefthanded workers.

It is still another object of the present invention to provide a micrometer caliper of the character described including a height gauge or scribing means attachment which is simply and accurately synchronized with the zero setting of the caliper.

These and various other objects and advantages of the invention will become apparent in the following description.

The invention accordingly consists in the features of construction, combinations of elements and arrangements of parts which will be exemplified in the devices hereinafter described and of which the scope of application will be indicated in the appended claims.

In the accompanying drawings in which are shown two of the various possible embodiments of the invention, FIG. 1 is a partially broken away side view of a micrometer caliper embodying the instant invention;

FIG. 2 is an exploded view of the carrier for the micrometer and movable jaw assembly of the instrument;

FIG. 3 is a fragmentary perspective view of the movable jaw assembly, a part of the micrometer, a part of the carrier and the scribing or height gauge attachment of the instant invention;

FIG. 4 is a side view of the micrometer caliper shown in FIG. 1 but with part of the carrier removed and with a scribing or height gauge attachment affixed to the movable jaw assembly;

FIG. 5 is a partially broken away enlarged view of the micrometer and its connection to the movable jaw assembly, showing the novel rotary motion cancelling mechanism;

FIG. 6 is a fragmentary view of a detail of the carrier for the movable jaw assembly;

FIG. 7 is an enlarged, fragmentary sectional view taken substantially along the line 7—7 of FIG. 6;

FIG. 8 is a fragmentary sectional view showing a detail of the carrier for the movable jaw assembly;

FIG. 9 is an exploded view of certain parts of the carrier and the movable jaw assembly;

FIG. 10 is an enlarged sectional view taken substantially along the line 10—10 of FIG. 3;

FIG. 11 is an exploded view of the movable jaw assembly showing the structure by means of which reproducible accurate readings are obtained;

FIG. 12 is a broken away sectional view showing the internal mechanism of the movable jaw assembly;

FIG. 13 is a view similar to FIG. 12 of the internal mechanism of the movable jaw assembly of a modified form of the invention; and FIG. 14 is a fragmentary sectional view of a detail of the holder for the scribing or height gauge attachment.

Generally, the object of providing a micrometer caliper capable of obtaining repetitive reproducible accurate readings is accomplished by providing shfitable sensing means, e.g., a movable feeler tip, on one of the caliper jaws, preferably the movable jaw. Said tip is mounted for movement toward and away from the other jaw from a neutral, i.e. idle, position to which it is resiliently biased. The tip moves between two particular reading positions, one of which is operative when an inside dimension is being measured and the other of which is operative when an outside dimension is being measured. The tip is so located that it will occupy one particular reading position when the micrometer caliper jaws are so disposed as to be correctly measuring an outer dimension of an object.

and the tip will occupy a different particular reading position when the jaws are so disposed as to be correctly measuring an internal dimension of an object. Indicating means is also provided, so that a user can tell the location of the feeler tip with respect to its neutral position, i.e., when it is at a selected one of said particular reading positions, whereby to know when the instrument is correctly measuring a dimension.

Referring now in detail to the drawings, the reference numeral 20 denotes a micrometer caliper constructed in accordance with the instant invention. Basically, the instrument comprises a calibrated beam 22 on which are mounted a movable jaw assembly 24 and a micrometer 26. Means is provided for mounting the movable jaw assembly and micrometer for longitudinal movement with respect to the beam, said means comprising a carrier 28. The beam is best seen in FIGS. 1 and 4. It is an L-shaped member fabricated from a material such as steel. The long (erect, as viewed in FIGS. 1 and 4) section 30 of the beam is provided with a series of V-shaped notches 32 spaced at exactly uniform center-to-center intervals, e.g., one-half inch, as shown. The notches are located in the edge of the long section remote from the short (horizontal, as viewed in FIGS. 1 and 4) section 34 of the beam. In line with the exact horizontal center of each notch is a scale line 36, and a numeral 38 is imprinted adjacent each line. The scale lines and the numerals are disposed on both opposite broad faces of the long section 30 at exactly corresponding locations whereby to provide gross (half inch interval) scales on both sides of the micrometer caliper commencing with 0 inches.

The short section 34 of the beam is provided with an elongated, fixed (lower jaw 40 at the end thereof remote from the long section. Said jaw includes a flat upwardly facing (as viewed in FIGS. 1 and 4) contact surface 42 for use when measuring outside dimensions and a downwardly convex (as viewed in FIGS. 1 and 4) contact surface 44 for use when measuring inside dimensions.

The carrier 28 is best seen in FIGS. 1, 2, 4 and 6–9 and will now be described. Said carrier includes a sliding box 46 fabricated from sheet steel, means for mounting the movable jaw assembly, and means for mounting the micrometer. The box comprises two spaced, coextensive, substantially parallel, flat sides 48 joined by an integral end wall 50 at one pair of coextensive end edges thereof. The opposite end of the box is open. The box is adapted to receive the long section 30 of the beam snugly slidably between the sides thereof with the notched edge of the beam adjacent the end wall 50. A pair of elongated registered horizontal slots is formed in the ends of the sides 48 adjacent the wall 50 midway between the top and bottom (as viewed in FIG. 2 of the drawings) of the sides. Said slots communicate with an opening in the wall 50 registered with the mouths of the slots, whereby to form a cut-out 52. The cut-out 52 is slightly larger than the notches in the beam, so that said notches can be centered in the cut-out. A window 54 is provided in each side 48 adjacent the slots whereby the associated scale line 36 and numeral 38 of any selected notch aligned in cut-out 52 are visible through the sides of the box from both sides thereof.

Means is provided to manually selectively lock the box on the beam with any selected notch aligned with the cut-out. Said means constitutes an oscillatable cam 56 rotatably mounted on the box 46 for movement into and out of the cut-out 52. The cam includes a locking end 58 and an actuating end 60. The locking end 58 is so shaped (i.e. is of V-shaped transverse edge configuration) that it partially snugly slidably fits the notches 32 of the beam; in other words, the locking end is partially snugly slidably receivable in each notch when the notch is lined up with the cam in the cut-out 52. Said locking end is so configured, i.e., is of gradually increasing radius, that it cannot rotate entirely through a notch. Rotation of the cam is effected by manual operation thereof by gripping and turning of its actuating end 60 (see FIGS. 1 and 4).

Means is provided to mount the cam sturdily on the box for oscillating movement of the locking end thereof into and out of the cut-out 52 of the box 46 despite the use of sheet metal in the manufacture of the box. Said means includes a pair of mounting brackets 62. Each bracket includes an ear 64 and a tail 66 (see FIGS. 2, 4 and 8). The tails are vertically (as viewed in FIG. 2) arranged against the inner surface of the wall 50 of the box; and the brackets are secured to the box by riveting of the tails to said wall with the ears facing one another and the tails extending in opposite directions. More specifically, one ear is located at the top of cut-out 52 with its tail projecting upwardly (as viewed in FIG. 4, and the other ear is located at the bottom of said cut-out with its tail projecting downwardly. As appears from FIGS. 2, 4 and 8, integral protruding rivets 68 are coined out of the material of the tails prior to assembly of the brackets to the box, and said rivets are received in openings 70 provided therefor in the wall 50. The rivets project through the openings 70, and the projecting ends are peened over against the outer surface of the wall, thereby tightly holding the tails and thus the brackets to the box, as clearly appears from FIG. 8.

The cam is mounted on the brackets by a headed cam lock screw 72 passing through registered openings 74 in the ears 64 and an opening 76 in the cam itself. A cam lock nut 78 tightened on the screw holds the screw in place and draws the ears into sufficient light frictional engagement with the cam to prevent accidental rotation of the cam.

As is shown in FIG. 2, the movable jaw assembly 24 includes an L-shaped housing the erect (as viewed in FIG. 2) portion 82 of which is formed with an erect elongated channel 84 of rectangular cross-section. The channel 84 is defined by a bank 86 remote from the horizontal (as viewed in FIG. 2) portion 88 of the housing and a shoulder 90 proximate to the horizontal portion 88.

Means is provided to mount the movable jaw assembly 24 in the sliding box 46 for axial translation with respect thereto. Said means comprises a fixed gib 92 and an adjustable gib 94 (see FIG. 2). The fixed gib includes a track 96 snugly slidably receivable in the channel 84 of the housing. A rectangular bank 98 spaced from and parallel to the track is provided in the fixed gib whereby a groove 100 is formed in said gib between the bank 98 and the track. The housing is disposed on the fixed gib with the track 96 received in channel 84 and with the bank 86 of the housing located in the groove 100 and riding on one face of the track 96. The adjustable gib 94 is located in groove 100 between bank 98 of the fixed gib and the bank 86 of the housing.

Means is provided to selectively adjust the friction between the housing and the fixed gib 92. Said means includes the adjustable gib, two spaced tapped openings 102 formed in the groove 100 of the fixed gib, and two spaced notches 104 formed in a longitudinal edge of the adjustable gib. Each notch is in registry with but somewhat larger than a different opening 102. The notches 104 face, i.e. open in the direction of, the bank 98, and the bottom end of each notch is provided with a chamfer 106 in the surface 108 of the adjustable gib remote from the base of the groove 100 of the fixed gib (see FIG. 9). The adjusting means also includes a conically headed adjustment screw 110 for each opening 102; the shank of the screw passes through the associated notch 104, and the head thereof engages the surface 108 at the chamfer 106. The adjustable gib is of such width that when it is in place in the groove 100 and the housing is located on the track 96, the housing is easily slidable axially. Tightening of the screws 110, however, causes the heads thereof to engage the chamfered section of the notches of the adjustable gib, thereby camming the adjustable gib towards and against the bank 86 of the housing. This causes the bank 86 of the housing to be frictionally engaged between the facing surfaces of the adjustable gib and the track 96 of the fixed gib. The screws are tightened sufficiently to frictionally lock the housing against any axial movement, and then they are backed off (loosened) enough so that without any transverse play the housing can slide axially with respect to the box. Then lock nuts 112 are screwed onto the ends of screws 110 which protrude from the surface of the fixed gib remote from the groove thereof. A pair of openings 113 is provided in each side 48 of the box in position to admit the head of the screws 110 and the lock nuts 112. In the manner described above, side play of the housing is prevented.

In addition to the foregoing adjustable means for inhibiting side play, manually manipulatable means is also provided for temporarily rigidly securing the housing to the movable jaw assembly. For this purpose an opening 114 is provided in each side of the box adjacent the lower edge thereof (as viewed in FIG. 2) at the end thereof remote from the wall 50. More specifically, the opening 114 in each side is registered with the opening in the other side, and both said openings are registered with a tapped opening 116 in the track 96 of the fixed gib 92. A headed screw 118 the shank of which is freely rotatable in one opening 114 is inserted through said opening and screwed into the tapped opening 116. The end of the screw enters the other opening 114 or is screwed thereinto if said other opening is tapped. If the screw is short enough, the opening 114 in the side other than the side through which the screw is initially inserted can be omitted. A slot 120 (see FIG. 9) is formed in the lower end of the channel 84 of the erect portion 82 of the movable jaw housing to accommodate the shank of screw 118 so that the housing can be lowered without striking the screw. The head of said screw 118 is roughened, as by knurling, so that the screw can be conveniently tightened manually, i.e., with the thumb and forefinger. Tightening of the screw causes the erect portion of the housing to be gripped firmly between the fixed gib and the side of the box through which the screw is initially introduced. In this way the housing can be rigidly secured in any particular position, e.g., the position the instrument is in when a scribing point is attached to the movable jaw assembly.

The fixed gib is permanently rigidly secured to the sliding box adjacent the edge of the long portion 30 of the beam remote from the notched edge thereof. For this purpose, a pair of spaced openings 122 is provided in each side 48 of the box 46, and a pair of spaced openings 124 is provided in the bank 98 of the fixed gib. All three pairs of openings are registered, and the fixed gib and two sides are permanently firmly held together by rivets 126 passing through said openings (see FIGS. 4 and 10).

A micrometer bracket is provided at the upper edges (as viewed in FIGS. 2, 6 and 7) of the box sides 48. Said bracket comprises a circular holder element 128 integral with two spaced legs 130. Each leg includes an opening 132 near the holder and a cut-out 134 in the upper edge thereof (as viewed in FIGS. 2 and 6) and remote from the holder. The openings and cut-out of each side are registered with the opening and cut-out, respectively, of the other side. A rectangular insert 136 is disposed between the legs 130, said insert being coextensive with the legs and including an opening 138 registered with the openings 132 of the legs.

Registered openings 140 are provided in the sides of the box adjacent the upper edges thereof at the end thereof remote from the wall 50. The bracket legs 130 with the insert 136 in position between them are inserted into the box between the sides 48 thereof, and the bracket and insert are oriented so that the openings 132, the opening 138 and the openings 140 are all in registery, and the upper edges of the legs, insert and sides (as viewed in FIGS. 2, 6 and 7) are aligned; then the upper edge of the sides in the region of the cut-outs 134 are clinched into the cut-outs, e.g. in a press, to secure the bracket and insert rigidly to the box. This can best be seen by reference to FIGS. 2, 6 and 7. A headed screw 146 is inserted into the registered openings 132, 138 and 140 and tightened against a nut 148 on the opposite side of the box. In this way the holder element 128 is tightened on the micrometer 26 so as to hold it securely in position.

The movable jaw assembly 24 is best seen in FIGS. 2, 3 and 9-13. As already mentioned, this assembly includes an L-shaped housing having an erect portion 82 and a horizontal portion 88. The horizontal portion 88 is formed with a broad shallow channel 150 on the face of the housing opposite from the face in which the channel 84 is disposed. The channel 150 is closed at the end adjacent the erect portion of the housing and extends perpendicularly to the erect portion towards the end of the horizontal portion remote from the erect portion. Near said end the channel 150 communicates with a slightly deeper channel 154 perpendicular thereto (see FIG. 11). A rack 156 is disposed in the channel 154, said rack including a central tooth-receiving notch 158 and a slot 160 on each side thereof. The notch 158 and the slots 160 face the channel 150.

Means is provided on the rack for sensing when the movable jaw is in such position that the instrument is accurately measuring a dimension sought to be measured. Said means comprises an elongated feeled tip 162 integral with the rack at the bottom end (as viewed in FIG. 11) thereof. Said tip projects in a direction away from the erect portion of the housing, is substantially vertically registered with the fixed (lower) jaw 40 and is parallel to said fixed jaw. The foregoing is best seen in FIGS. 1 and 4. As is apparent, axial movement of the movable jaw assembly moves the feeler tip 162 axially toward and away from the fixed jaw. The feeler tip includes an upwardly convex contact surface 164 for reading of inside dimensions and a flat downwardly facing contact surface 166 for reading outside dimensions. The contact surface 42 of the fixed jaw and the contact surface 166 of the movable jaw are parallel to one another.

The rack is snugly slidable in channel 154 whereby it, and thus the feeler tip 162 is capable of axial translation with respect to the housing and thus with respect to the lower jaw 40 between an upper reading poesition (as viewed in FIG. 1) wherein the tip is remote from the lower jaw and a lower reading position in which the tip is slightly closer to the lower jaw. Means is provided cooperating with the slots 160 of the rack to bias the rack and thus the feeler tip carried thereby to a neutral position midway between said two reading positions. Said means constitutes a U-shaped spring 168 seated in a U-shaped groove 170 in the channel 150. The groove 170 communicates with the channel 154 and includes outer lower and outer upper walls defined by portions of the lower and upper walls, respectively, of the channel 150 and an outer end wall defined by a ridge 172 formed in the channel 150 perpendicular to said outer lower and upper walls. The inner wall of the groove is continuous and is defined by the periphery of a rectangular plateau 174 located in the channel 150. (See FIG. 11). The open ends of the groove 170 are aligned with and in substantial registry with the slots 160 of the rack when the rack is in its neutral position. This is shown in FIG. 12. The ends 176 of the spring 168 project slightly into the channel 154, and each end enters a different slot 160 of the rack. The legs of the spring prior to insertion of the spring into its groove 170 diverge slightly from one another so that they must be squeezed together in order to fit the spring into said groove. The width of the legs of the spring is less than the width of the groove 170 and the slots 160, and as a result of this and of the bias of the legs to a divergent position with respect to one another, in the neutral position of the rack the legs contact the upper and lower walls of the groove 170 and the upper end of the spring engages the upper wall of the upper slot 160, while the lower end of the spring engages the lower wall of the lower slot 160 (all as viewed in FIGS. 11 and 12).

A notch 178 is formed in the channel 154 at the lower end thereof (as viewed in FIGS. 11 and 12). to accommodate the horizontally extending feeler tip 162 and allow room for axial movement thereof with respect to the housing.

A bifurcated pointed 180 is provided. Said pointer includes a flat shank 182 mounted for rotary movement on the plateau 174. Said pointer also includes a narrow elongated neck 184 integral at one end with an end of the shank and terminating at the other end in an arrow-like tip 186. A parallel spaced coextensive tip 188 is joined to the tip 186 by an integral bend 190 spaced from the extreme ends of the tips. An indicating element 192 is located in the channel 150 adjacent the erect portion of the housing. Said element includes two spaced calibration lines 194 on each side thereof constituting two reading positions of the pointer, to wit, an upper reading position and a lower reading position as viewed in FIG. 11. The two sides of the indicating element 192 are identical, i.e., a line 194 on one side is aligned with a corresponding line on the other side, whereby two pairs of lines are provided each of which pair shows from either side of the element a different reading position of the pointer. A different tip of the bifurcated pointer is disposed on each side of the indicating element, the tip 188 being disposed behind (as view in FIG. 11) the element and the tip 186 being disposed in front thereof (as viewed in FIG. 11). The lines 194 are radially oriented so that when the tips of the pionter are in their reading positions, they are aligned therewith.

The shank 182 includes a tooth 196 integral with the end thereof remote from the neck 184 and projecting into the tooth-receiving notch 158 of the rack. The tooth is snugly received in the notch so that there is no play between them within the range of movement of the tips 186, 188 between their two reading positions. Said tooth is rounded at its upper and lower ends (as viewed in FIGS. 11 and 12), so that it will maintain contact with the flanks of the notch 158. The shank 182 is pivoted on the plateau 174 about a pin 198 passing through registered openings 200 and 202 in the plateau and shank, respectively. Opening 200 extends through the bottom wall of the channel 150.

The spring 168 opposes axial movement of the rack and thus biases the rack, and thereby the feeler tip to the neutral position of the rack. At this position of the rack, the pointer tips are at their neutral position midway between the reading positions, indicated by the calibration lines 194. Axial movement of the rack causes rotary movement of the pointer, the axial movement being translated by engagement of the tooth 196 in the notch 158 into rotary movement of the shank on the pivot pin 198. Upward movement of the rack (as viewed in FIG. 12) to the upper reading position of the feeler tip causes movement of the pointer to its lower reading position, and downward movement of the rack to the lower reading position of the feeler tip causes movement of the pointer to its upper reading position. The spring will return the rack, the feeler tip and the pointer tips to their respective neutral positions when the force causing axial movement of the rack is removed. Because the pivot of the shank 182 is much closer to the rack than it is to the tips of the pointer, a given amount of movement of the tooth 196 causes a greater movement of the pointer tips, so that an amount of movement of the rack so small as to be unnoticeable to the eye causes sufficient movement of the pointer tips for a user to readily observe their position.

The pointer tips can move slightly past the reading positions thereof, such movement being limited by abutment of the top and bottom edges of the shank 182 against stops 204 provided on the plateau 174.

An elongated cover 206 is provided to close the movable jaw assembly except for the notch 178. Said cover includes horizontally chamfered top and bottom edges 208, 210 (as viewed in FIG. 11) which are slidable in dovetail slots (not shown) formed in the facing surfaces of the walls which define the channel 150. An integral perpendicular upwardly projecting (as viewed in FIG. 11) flange 212 is provided at the upper edge of the cover at the end thereof remote from the erect portion 82 of the movable jaw housing. Said flange carries a tab 214 disposed at right angles thereto and projecting over the open top end of channel 154. The outer side wall 215 of the channel 154 terminates short of the upper edge of the housing whereby to produce a seat 216 over which the tab 214 is slidable. When the cover is in position, the tab is aligned with the upper surface of the horizontal portion 88 of the housing and completely closes the upper end of channel 154. An opening 218 is formed in the cover, said opening being in registry with the openings 200 and 202 of the shank and the plateau when the cover is in place. In assembling the movable jaw assembly, the pivot pin 198 is not inserted until the cover is in place. The pin is very slightly larger in diameter than the openings 200, 202 and 218 so that it has to be force-fitted into place in said openings. The ends thereof are then ground down to fit smoothly against the outer surfaces of the housing and cover.

The cover includes also an indent 220 which is large enough to be engaged by a tool or a user's thumbnail, whereby to slide the cover off the housing (after removal, of course, of the pin 198), if opening of the movable jaw assembly is necessary for purposes of repair, etc.

A window 222 is formed in the cover in registry with the indicating element 192, and a similar window 224 is provided in the channel 150 of the housing. The windows are preferably closed by a transparent material such as a clear transparent plastic or tempered glass.

As a result of the above described construction of the movable jaw assembly, the indicating element is visible from both sides of the instrument, and one pointer tip can be seen on each side. Still further, the pointer tips can be located very close to the indicating element 192, whereby parallax in viewing from either side of the instrument can be avoided. More important, the foregoing construction of the movable jaw assembly permits the making of repeated, accurate measurements, as will be explained in detail hereinafter.

In FIG. 13 a modified form of the invention including different means for biasing the pointer and feeler tip to neutral position is shown. This form is the same as the preferred embodiment already described, except for modification of the rack and use of a different type of neutralizing spring. Instead of the U-shaped neutralizing spring 168, two leaf springs 226 are provided on the shank 182 projecting horizontally above and below (as viewed in FIG. 13) the neck 184 of the pointer 180 toward the erect portion of the housing. Each spring is bent to include a diverging leg 228 which abuts a wall of the channel 150. Thus, the tip of the upper spring engages the upper wall, and the tip of the lower spring engages the lower wall. The legs of the spring diverge from one another in the direction of the erect portion of the housing, and the springs are so formed that but for the limiting action of the walls the legs would diverge even further, so that the springs are somewhat compressed when the pointer is in place in neutral position. Thus, the springs 226 perform the same biassing function as does spring 168 of the preferred form of the invention. The springs 226 are secured to the shank as by brazing a section of their parallel portions thereto. In the modified form of the invention shown in FIG. 13 the slots 160 of the rack are omitted as unnecessary. Thus, in this form of the invention fabrication of the rack is simplified.

The micrometer 26 will now be described. Said micrometer can best be seen in FIGS. 1, 3, 4 and 5. The micrometer includes an elongated tubular thimble 230 the outer surface of which is roughened in the upper region thereof to provide a convenient manipulating surface. At the lower end of the thimble (as viewed in FIG. 5) the outer surface thereof is chamfered downwardly and inwardly to provide a short beveled annular area on which a circular calibrated scale 234 is disposed. A coaxial spindle 236 is non-rotatably secured in the thimble. Said spindle includes a conical head 238 received in a matching seat 240 formed inside the thimble at the upper end thereof. Said head is provided with a tapped opening 242 which communicates with a clear through opening 244 of slightly larger diameter formed in said upper end of the thimble. A headed screw 246 is inserted through the opening 244 and screwed into the opening 242 in order to non-rotatably secure the spindle to the thimble. The lower surface of the head of the screw is received in an annular seat formed in the top of the thimble. The screw 246 is loosened to permit rotation of the thimble with respect to the spindle when it is desired to calibrate the instrument.

The spindle is much longer than the thimble and projects downwardly (as viewed in FIG. 5) therefrom. The spindle includes a long threaded portion 250 extending from a short distance below the head 238. The threaded portion of the spindle is threadably received in an internally tapped upper section 252 of a fixed hub 254 about which the thimble is snugly rotatable. The outer surface of the upper section 252 is provided with a vertically calibrated scale 256.

The hub also includes a lower section 258 adapted to be gripped by the micrometer mounting bracket 128 of the carrying assembly. Said lower section has a slightly smaller outer diameter than the upper section whereby the two sections are separated by a step 260. The step aids in orientation of the hub in the bracket. As is apparent, with the hub held in the bracket against rotary movement, rotation of the thimble causes the spindle to rotate in the hub with the result that the thimble and spindle are caused to move unitarily up or down (as viewed in FIG. 5) depending on the direction of rotation of the thimble. As is conventional, clockwise rotation of the thimble causes downward movement thereof and counter-clockwise rotation causes upward movement.

The lower end 262 of the spindle is connected via an external rotary movement cancelling means to the top surface of the housing of the movable jaw assembly, whereby rotary and axial movement of the spindle causes only axial movement of the movable jaw assembly which is held in the carrying assembly against rotary movement. Pursuant to the present invention, the external means for cancelling rotary movement of the spindle includes a tubular attachment body 264, a tubular wear washer 266, a locking plug 268, a headed locking screw 270, and a locking sleeve 272. The wear washer 266 is rigidly secured to the lower end of the spindle by the locking screw 270 which passes through an opening 274 in the washer and is screwed into a tapped opening 276 in said lower end. The head of the screw is cone-shaped and is partially received in a downwardly facing and outwardly flaring conical seat 280 formed in the bottom surface of the washer. The seat substantially matches the contour of the head of the screw. The top surface of the washer abuts the bottom surface of the lower end of the spindle.

The attachment body comprises an inverted cup the side wall of which is provided with an internal thread and the top of which includes a through opening 288 slightly larger in diameter than the outer diameter of the lower end of the spindle, whereby said lower end is rotatable in said opening. The diameter of the opening 288 is less than the external diameter of the wear washer 266, so that the lower surface of the top of the body abuts the top surface of the washer.

The locking plug 268 is a right-side-up cup-shaped object the side wall of which is externally threaded. Said plug is threadably received in the internally threaded attachment body. The internal diameter of the plug is greater than the diameter of the head of the screw 270 but less than the outer diameter of the wear washer, and the outer diameter of the plug is greater than the inner diameter of the wear washer at the bottom surface of the washer. As a result, the top surface of the side wall of the plug can abut the lower surface of the washer and surrounds and will not touch the head of the screw 270.

The bottom of the plug 268 includes an opening 304 through which a headed attachment screw 306 is inserted with the head thereof captively received inside the plug against said bottom. The lower surface of the bottom of the plug is provided with a shallow rectangular channel 308 communicating with the opening 304 and adapted to snugly receive the upper surface of the housing. The screw 306 is received in a tapped opening 312 provided in said upper surface of the housing, whereby the movable jaw assembly is held non-rotatably to the spindle.

In assembling the external means for cancelling rotary movement to the movable jaw assembly and the spindle, the attachment body must be in place on the spindle before the wear washer is locked to the lower end of the spindle, and the housing must be secured to the plug bottom before the locking plug is screwed into the attachment body. After the just mentioned pre-assembly steps have been carried out, the locking plug is screwed into the attachment body until the top surface of the plug side wall abuts the lower surface of the wear washer and the lower surface of body top abuts the top surface of the wear washer; the plug is then tightened until the friction between the wear washer and the lower surface of the body top and between the wear washer and the top surface of the plug wall is great enough to prevent rotation of the wear washer and thus prevent rotation of the spindle. Then the plug is backed off slightly (loosened) so that the friction is reduced just enough to permit rotation of the wear washer and thus the spindle but not enough for there to be any significant axial play of the wear washer between the top surface of the plug side wall and the lower surface of the body top. The locking sleeve 272 is then screwed upon the plug until it abuts the body. In this way the setting of the plug in the body is locked against accidental or unintentional change. Preferably, notches 316 are provided in the sleeve to permit gripping thereof by a tool, e.g., a spanner wrench, for tightening the locking sleeve on the plug against the bottom surface of the attachment body wall.

In the foregoing manner a simple, easily repairable, external rotary motion cancelling means is provided. Moreover, said means does not detract from the accuracy of the instrument since the plug and body are so adjusted with respect to the wear washer that the latter, while rotatable with respect hereto, is not axially translatable with respect thereto; in other words, the wear washer and thus the spindle can be rotated with respect to the movable jaw assembly which is attached to the plug, but the spindle is not axially movable with respect to said assembly.

The micrometer caliper of the instant invention operates as follows: If an outside dimension of an object is to be measured, the box 46 of the carrying assembly is moved upwardly and the micrometer is rotated so as to move the housing away from the fixed jaw a sufficient distance to admit the dimension of the object to be measured between the fixed jaw and the feeler tip of the movable jaw with the two oppositely facing surfaces or points of the object which define the dimension to be measured oriented to face the contact surface 42 of the fixed jaw and the contact surface 166 of the feeler tip. The box is then moved toward the fixed jaw and locked by the cam 56 in the lowest notch 32 (as viewed in FIG. 4) at which the box can be locked without the contact surfaces 42 and 166 both engaging the object.

Then the micrometer thimble is rotated to lower the feeler tip until with one oppositely facing dimension-defining surface or point of the object in contact with the contact surface 42 of the fixed jaw, the feeler tip contact surface 166 just barely touches the other oppositely facing dimension-defining surface or point of the object. At this time the pointer tips 186 and 188 of the feeler tip sensing means will still be at their neutral positions. The micrometer thimble is then rotated to move downwardly further until the pointer tips reach the lower reading positions (at which instant the feeler tip is at its upper position); the instrument is now ready to be read.

In the case of measuring an inside dimension, the box is moved downwardly and the micrometer is rotated to lower the housing toward the fixed jaw enough for the feeler tip and the fixed jaw to be inserted into the object to be measured. On insertion of said feeler tip and fixed jaw, they are oriented so that the contact surface 164 of the feeler tip faces one of two facing dimension-defining surfaces or points of the object and so that the contact surface 44 of the fixed jaw faces the other of said two facing surfaces or points. The box is then moved away from the fixed jaw and locked by the cam in the highest notch (as viewed in FIG. 4) at which the box can be locked without contact surfaces 44 and 164 both touching the object. Then the micrometer thimble is rotated to move upwardly until with one of said two facing dimension-defining surfaces or points of the object contacting contact surface 44 of the fixed jaw, the other facing dimension-defining surface or point just touches contact surface 164 of the feeler tip. The pointer tips will at this point be in their neutral position. The thimble is then rotated to move upwardly further until the pointer tips are in their upper reading positions (at which instant the feeler tip is at its lower reading position). The instrument is now ready to be read.

The instrument is read conventionally. For outside dimensions the gross scale reading is that of the calibration line 36 opposite the notch 32 in which the cam is locked. To this is added the reading on the scale 256 provided on the hub of the micrometer. And finally, to the total of the last mentioned readings is added the reading from the scale 234 on the thimble. For an inside dimension, a deduction for the height of the feeler tip and fixed jaw is applied. The deduction is a round figure, e.g. ¼ of an inch.

To calibrate the instrument before its initial use and to reset the calibration if necessary, all scales, except the scale 234 on the micrometer thimble, are set to zero. Then the thimble is rotated until the pointer tips are at their lower reading position. The screw 246 is loosened, and the thimble is rotated with respect to the spindle until its scale 234 reads zero, and said screw is retightened.

As is apparent, the micrometer caliper of the present invention is capale of being easily read by left-handed and right-handed users because the scales on the beam are visible from both sides of the instrument. Likewise, the final setting can be easily made by both left-handed and right-handed users since the pointer tips are visible from both sides. Moreover, the pointer tips can visually be aligned accurately with their associated calibration lines because parallax has been minimized.

The movable feeler tip arrangement makes possible repetitive reproducible accurate readings because the final setting of the instrument for measurement of a given dimension is not controlled by the user's feel or by a slipping clutch arrangement. The pointer will float to a reading position when the instrument is set to be read and such setting will to all intents and purposes be independent of the pressure between the feeler tip and the object being measured. The motion magnification obtained by the short arm constituting the tooth 96 and the long arm (which extends from the pivot point to the tips) enables the reading position of the pointer tips to be set with great accuracy. This is a vast improvement over conventional micrometers and micrometer calipers wherein the setting at which the reading is taken usually varies, as previously described, with extraneous factors unrelated to the size of the dimension being measured, such, for example, as the user's feel, temperature, lubrication, etc.

Pursuant to the instant invention a new and improved height gauge and scriber attachment is provided. Said attachment is shown in FIGS. 3, 4 and 14 and includes an elongated base, i.e. stand, 318 fabricated from a heavy material such as cast iron. Said base includes two flat parallel surfaces, namely, a bottom surface 320 arranged to be seated on a flat object and a top surface 322 adapted to receive the bottom surface 324 of the horizontal portion 34 of the beam. The surface 322 is of rectangular shape, and the surface 324 is receivable thereon between an upwardly projecting (as viewed in FIG. 4) horizontally elongated fixed pedestal 326 integral with the base and a circular movable jaw 328 disposed in facing relationship to the pedestal 326. The jaw 328 is rotatably secured on a threaded shaft 330 which projects in a direction away from the pedestal 326 and is screwed into a tapped bearing 332 formed on the base 318. A knurled actuating knob is non-rotatably secured on the end of the shaft projecting from the bearing and remote from the pedestal. The facing surfaces of the pedestal and jaw are parallel and act as a vise.

To us the attachment the horizontal portion of the beam is first disposed between the pedestal and jaw with the bottom surface 324 thereof squarely seated on the surface 322 of the base. The horizontal portion is then caught tightly between the parallel facing surfaces of the pedestal and jaw by rotating the knob so as to cause the movable jaw to shift toward the fixed pedestal. For a reason to become apparent hereinafter, the beam is mounted on the base with the feeler tip and fixed jaw substantially aligned with or disposed beyond an end of the base.

The attachment also includes a scriber and height gauging mechanism manually detachably attachable to the housing of the movable jaw assembly. Said mechanim includes a clamp 336 in which a scriber bar 338 having a rectangular cross-section is captively received. Said holder comprises two coextensive elongated clamping strips of metal 340, 342 arranged in face-to-face relationship and constituting essentially mirror images of one another. Each strip includes a facing vertical (as viewed in FIG. 14) V-shaped channel the angle of the V being approximately 90°. The two channels form a rectangular opening 344, and the scriber bar is axially slidable but non-rotatably received in said opening. The strip 340 includes a tapped opening 346 registered with an untapped (clear) opening 348 of slightly larger diameter in the strip 342. A clamp screw 350 is provided having a threaded shank adapted to pass through the opening 348 and be threadably received in opening 346. Said screw includes a shoulder 354 adapted to abut the strip 342 whereby when the screw is tightened into the opening 346 the strips are drawn together, thereby firmly gripping the bar and preventing axial movement thereof. The head of the screw 350 is knurled. The foregoing is best seen in FIG. 14.

The clamping strip 342 includes a perpendicular attaching flange 358 (see FIG. 3) which extends over the upper surface of the strip 340 at the end thereof remote from the rectangular opening 344. Said flange includes a clear opening 360 through which the threaded shaft of a headed attaching screw 362 passes. A tapped opening 364 is provided in the upper surface of the housing, and the clamping strip 342 is secured at one side of the housing by inserting said screw 362 through the opening 360 and tightening it into the opening 364. The strip 340 is secured on the other side of the housing by means of the clamp screw 350. When the clamp 336 is in place on the housing, the bar is oriented at right angles to the housing and extends downwardly past the feeler tip, fixed jaw, and associated end of the base.

The bar includes a circular threaded tip 366 at the upper end thereof. Said tip extends above the clamping strips when the bar is in the rectangular opening 344, and a nut 368 is screwed onto said tip whereby to prevent the bar from falling out of the rectangular opening when the clamp screw is loosened. An elongated scriber foot 368 which includes a sharp scriber point 370 is rigidly permanently secured to the lower end of the bar 338 at right angles thereto as by force-fitting said end into an opening in the foot. As is apparent from FIGS. 3 and 4, when the bar is assembled in the clamping strips and the latter are secured to the housing, the scriber foot is so oriented that the longitudinal axis thereof is parallel to and aligned with the horizontal portion of the beam, and the point of the scriber foot faces directly away from the beam and lies in the vertical plane thereof. The bottom surface of the scriber foot is flat.

The bar extends through a tubular bushing 372 located between the scriber foot and the clamping strips. The bar is long enough so that with the instrument set at zero on all scales and with the bar extending downwardly through the square opening as far as possible, i.e., until nut 368 abuts the top surfaces of the clamping strips, the bottom surface of the scriber foot is in a horizontal plane below the horizontal plane of the bottom surface of the base. The bushing is somewhat shorter in length than the distance between the lower surfaces of the holder strips and the top surface of the scriber foot when the bar is oriented and the instrument set as just described. A coil spring 374 is partially received in the bushing between an annular internal seat (not shown) therein and the top surface of the scriber foot; the seat is so located and the spring is of such length that with the bar fully extended below the rectangular opening and with the instrument set at zero, as just described, the spring is compressed between the seat and the top surface of the scriber foot.

The attachment is calibrated to zero as follows: the horizontal portion of the beam is squarely seated on the top surface of the base between the pedestal and jaw, and the movable jaw is rotated to tightly secure the horizontal portion in position in the vise. The scribing mechanism is secured to the housing, the clamp screw 350 is loosened so that the bar can move in the opening 344 of the holder, and the instrument is set a zero on all scales. At this point the spring 374 biases the scriber foot downwardly as far as it will go so that the lower surface of the foot is below the horizontal plane of the lower surface of the base. Then the base is set on a flat surface. This causes the scriber foot and thus the bar to be shifted upwardly as the lower surface of the scriber is forced by the flat surface on which the base has been set into the same plane as that of the lower surface of the base. The clamp screw 350 is then tightened so that the bar can no longer move axially. At this point the scriber has been accurately set at zero and the instrument can be used in the conventional manner as a height gauge and scriber. It will be observed that the zero setting is independent of any manual adjustment of the scriber foot and is reproducible since it depends solely on the pressure exerted by the spring 374.

As is apparent from the foregoing, an attachment of the construction described above can be easily, conveniently and accurately attached to and zeroed to the micrometer caliper.

It thus will be seen that there have been provided an instrument and attachment therefor which achieves the several objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention, there is claimed as new and desired to secure by Letters Patent:

1. A caliper including: a fixed jaw, a movable jaw assembly, means mounting said fixed jaw and movable jaw assembly for bodily linear movement of the movable jaw assembly with respect to the fixed jaw, the fixed jaw including a contact point oppositely disposed with respect to a contact point on the movable jaw assembly, said movable jaw assembly including a housing, a rack, a feeler tip rigid with and carried by the rack, said feeler tip carrying the contact point of the movable jaw assembly, means mounting said rack in the housing for linear movement of the rack and the feeler tip parallel to the movement of the movable jaw assembly between a neutral position and a predetermined reading position of the feeler tip, means biasing the rack and the feeler tip to the neutral position of the feeler tip, said rack being freely movable with respect to the housing except for the action of said biasing means, indicating means actuated by the rack for visually indicating when the feeler tip is in a predetermined reading position, said means including a calibrated member including scale lines on both sides thereof, and a bifurcated indicating pointer having two tips one of which is disposed adjacent one side of the calibrated member and the other of which is disposed adjacent the other side of the calibrated member, means mounting said pointer on the housing for rotary movement, cooperating means on the rack and pointer for translating linear movement of the rack into rotary movement of the pointer tips between a neutral position at which said tips are located when the feeler tip is in its neutral position and a reading position at which the pointer tips are located when the feeler tip is in a reading position, said cooperating means comprising a positive kinematic train between the rack and pointer, and means for measuring the distance between said contact points, said last-mentioned means including scale means calibrated to be read when the pointer tip indicates that the feeler tip is in a reading position.

2. A caliper as set forth in claim 1, wherein the housing includes two broad sides and a viewing window in each said side, and wherein the scale lines of the calibrated member are visible from both sides of the housing through said windows.

3. A micrometer caliper comprising: a micrometer including a hub, a thimble rotatable with respect to the hub, and a movable jaw assembly including a housing; and a caliper including a fixed jaw having a contact point oppositely disposed with respect to a contact point on the movable jaw assembly, sensing means on the movable jaw assembly, said last-mentioned means carrying the contact point of the movable jaw assembly, and a carrier, said carrier including a sliding box, said box including a broad flat side disposed in a plane parallel to the direction of movement of the movable jaw assembly, a bracket carried by said box, said bracket being adapted to non-rotatably, non-slidably grip the hub of the micrometer, means in said box for guiding and controlling movement of the movable jaw assembly with respect to the fixed jaw, said last-mentioned means including a fixed gib, an adjustable gib, means securing the fixed gib to the side of the box, means defining an elongated groove in said fixed gib extending parallel to the direction of movement of the movable jaw assembly, said groove defining means including an elongated track longitudinally parallel to the direction of movement of the movable jaw assembly, said movable jaw assembly housing including means defining an elongated channel in which the track is snugly slidable, said channel defining means including an elongated bank, said channel and bank being longitudinally parallel to the direction of movement of the movable jaw assembly, said housing being disposed on the fixed gib with the track of the fixed gib received in the channel and with the bank of the housing received in the groove, said adjustable gib being disposed in the fixed gib adjacent the housing bank, and means controllably setting the position of the adjustable gib with respect to the bank so as to take up side play between the adjustable gib and bank.

4. A micrometer caliper comprising: a micrometer including a hub, a thimble rotatable with respect to the hub, and a movable jaw assembly including a housing; and a caliper including a fixed jaw having a contact point oppositely disposed with respect to a contact point on the movable jaw assembly, sensing means on the movable jaw assembly, said last-mentioned means carrying the contact point of the movable jaw assembly, and a carrier, said carrier including a sliding box, said box including a broad flat side disposed in a plane parallel to the direction of movement of the movable jaw assembly, a bracket carried by said box, said bracket being adapted to non-rotatably, non-slidably grip the hub of the micrometer, means in said box for guiding and controlling movement of the movable jaw assembly with respect to the fixed jaw, said last-mentioned means including a fixed gib, an adjustable gib, means securing the fixed gib to the side of the box, means defining an elongated groove in said fixed gib extending parallel to the direction of movement of the movable jaw assembly, said groove defining means including an elongated track longitudinally parallel to the direction of movement of the movable jaw assembly, said movable jaw assembly housing including means defining an elongated channel in which the track is snugly slidable, said channel defining means including an elongated bank, said channel and bank being longitudinally parallel to the direction of movement of the movable jaw assembly, said housing being disposed on the fixed gib with the track of the fixed gib received in the channel and with the bank of the housing received in the groove, said adjustable gib being disposed in the fixed gib adjacent the housing bank, and means controllably setting the position of the adjustable gib with respect to the bank so as to take up side play between the adjustable gib and bank, said controllably setting means comprising means defining a notch in said adjustable gib, means defining a tapped opening in said fixed gib, said notch and opening being registered, and a headed screw receivable through said notch and threadably receivable in said opening, said screw and notch including cooperating cam surfaces to cam the adjustable gib in the direction of the track on tightening of said screw.

5. A micrometer caliper comprising: a micrometer including a hub, a thimble rotatable with respect to the hub, and a movable jaw assembly including a housing; and a caliper including a fixed jaw having a contact point oppositely disposed with respect to a contact point on the movable jaw assembly, and a carrier, said carrier including a sliding box, said box including a broad flat side disposed in a plane parallel to the direction of movement of the movable jaw assembly, a bracket carried by said box, said bracket being adapted to non-rotatably, non-slidably grip the hub of the micrometer, means in said box for guiding and controlling movement of the movable jaw assembly with respect to the fixed jaw, said last-mentioned means including a fixed gib, an adjustable gib, means securing the fixed gib to the side of the box, means defining an elongated groove in said fixed gib extending parallel to the direction of movement of the movable jaw assembly, said groove defining means including an elongated track longitudinally parallel to the direction of movement of the movable jaw assembly, said movable jaw assembly housing including means defining an elongated channel in which the track is snugly slidable, said channel defining means including an elongated bank, said channel and bank being longitudinally parallel to the direction of movement of the movable jaw assembly, said housing being disposed on the fixed gib with the track of the fixed gib received in the channel and with the bank of the housing received in the groove, said adjustable gib being disposed in the fixed gib adjacent the housing bank, and means controllably setting the position of the adjustable gib with respect to the bank so as to take up side play between the adjustable gib and bank.

6. In a micrometer caliper including (a) a micrometer to which is secured a movable jaw assembly, and (b) a caliper including a beam bearing gross graduations and having notches disposed in a longitudinal edge thereof in correspondence with the graduations, said notches being adapted to receive a cam rotatable into and out of engagement with individual notches, said beam having a fixed jaw: a carrier for the micrometer, said carrier including a sheet metal sliding box translatable along the beam, said box including a broad, flat side and an elongated end wall perpendicular thereto, a cut-out in said wall, said cut-out being adapted to be aligned with any one of the notches of the beam, and means mounting the cam for oscillatory movement into and out of the cut-out, said means comprising a mounting bracket including an elongated tail and an ear integral therewith and disposed perpendicular thereto, said ear rotatably mounting the cam, said tail including integral protruding rivets, means providing openings for said rivets in the end wall, the tail being juxtaposed against said end wall to one side of the cut-out, said tail being secured to the end wall by the rivets with the ear disposed perpendicular to the end wall and flat side and adjacent an end of said wall proximate to the cut-out.

7. In a micrometer caliper comprising (a) a micrometer including a hub, and (b) a caliper including a beam: a carrier for the micrometer, said carrier including a sheet metal sliding box translatable along the beam, said box including two spaced, flat, broad, parallel, coextensive sides and means for non-rotatably and non-slidably gripping the hub of the micrometer, said means comprising a bracket including two spaced, parallel legs disposed between the sides of the box, a cut-out at an edge of each leg, the cut-outs being registered, the edges of the legs including the cut-outs being aligned with one another and with an edge of each side of the box, and the sides of the box being clinched into the cut-outs in the area of the sides adjacent the same.

8. In a combination, a caliper, and a scribing and height gauging attachment for the caliper: said caliper including a beam, said beam including a fixed jaw, a movable jaw, means mounting said movable jaw for linear movement toward and away from the fixed jaw, and a flat surface on the beam, said surface being disposed perpendicular to the direction of the movement of the movable jaw; said attachment including a base, a first flat surface on said base, manually operable means on said base for releasably gripping the beam with said flat surface thereof squarely seated on said first flat surface of the base, a second flat surface on the base, said second flat surface being spaced from and parallel to said first flat surface of the base and being adapted to be seated on a flat support, a clamp, means detachably and rigidly securing the clamp to the movable jaw, said clamp including means defining a straight passageway, said passageway being disposed with its longitudinal axis parallel to the direction of movement of the movable jaw, an elongated bar slidably and non-rotatably received in said passageway whereby said bar is axially shiftable parallel to the direction of movement of the movable jaw, said bar including an end located proximate to the clamp and an end located remote therefrom, a scriber foot rigidly secured to said remote end of the bar, said foot including a point facing directly away from the movable jaw and lying in the vertical plane thereof, said foot also including a flat surface facing parallel to and facing in the same direction as the second flat surface of the base, means biasing the bar towards a position in which the scriber foot surface is further from the clamp than said second surface of the base, and manually manipulatable means for releasably locking the bar to the clamp against axial movement of the bar with respect to the clamp.

9. In a combination, a caliper, and a scribing and height gauging attachment for the caliper: said caliper including a beam, said beam including a fixed jaw, a movable jaw, means mounting said movable jaw for linear movement toward and away from the fixed jaw, and a flat surface on the beam, said surface being disposed perpendicular to the direction of the movement of the movable jaw; said attachment including a base, a first flat surface on said base, manually operable means on said base for releasably gripping the beam with said flat surface thereof squarely seated on said first flat surface of the base, a second flat surface on the base, said second flat surface being spaced from and parallel to said first flat surface of the base and being adapted to be seated on a flat support, a clamp, means detachably and rigidly securing the clamp to the movable jaw, said clamp including means defining a straight passageway, said passageway being disposed with its longitudinal axis parallel to the direction of movement of the movable jaw, an elongated bar slidably and non-rotatably received in said passageway whereby said bar is axially shiftable parallel to the direction of movement of the movable jaw, said bar including an end located proximate to the clamp and an end located remote therefrom, a scriber foot rigidly secured to said remote end of the bar, said foot including a point facing directly away from the movable jaw assembly and lying in the vertical plane thereof, said foot also including a flat surface parallel to and facing in the same direction as the second flat surface of the base, a bushing in which said bar is movably disposed, said bushing being disposed between the clamp and the scriber foot, said bushing including a seat, a coil spring disposed between said seat and said scriber foot and biasing the foot towards a position in which the surface thereof is further from the clamp than said second surface of the base, and manually manipulatable means for releasably locking the bar to the clamp against axial movement of the bar with respect to the clamp.

References Cited
UNITED STATES PATENTS

| | | | |
|---|---|---|---|
| 353,561 | 11/1886 | Hurst | 33—147 |
| 752,823 | 2/1904 | Cary | 33—143 |
| 1,129,937 | 3/1915 | Wilson | 33—143 |
| 1,459,500 | 6/1923 | Cady | 33—148 |
| 2,454,327 | 11/1948 | Malsom | 33—169 X |
| 2,468,995 | 5/1949 | Morrison | 33—169 X |
| 2,617,199 | 11/1952 | Samotey | 33—170 |
| 2,741,848 | 4/1956 | Livingston | 33—147 X |
| 2,844,878 | 7/1958 | Zwierzynski | 33—170 |
| 3,104,646 | 9/1963 | Minetti | 116—133 |
| 3,224,103 | 12/1965 | Kiralfy | 33—169 X |

LEONARD FORMAN, *Primary Examiner.*

S. S. MATTHEWS, *Examiner.*